(12) United States Patent  
Lefaudeux

(10) Patent No.: US 8,004,675 B2  
(45) Date of Patent: Aug. 23, 2011

(54) METHOD AND SYSTEM FOR STOKES POLARIZATION IMAGING

(75) Inventor: Nicolas Lefaudeux, Los Angeles, CA (US)

(73) Assignee: Boss Nova Technologies, LLC, Venice, CA (US)

( * ) Notice: Subject to any disclaimer, the term of this patent is extended or adjusted under 35 U.S.C. 154(b) by 293 days.

(21) Appl. No.: 12/234,103

(22) Filed: Sep. 19, 2008

(65) Prior Publication Data

US 2009/0079982 A1    Mar. 26, 2009

Related U.S. Application Data

(60) Provisional application No. 60/994,384, filed on Sep. 20, 2007.

(51) Int. Cl.  
*G01J 4/00* (2006.01)

(52) U.S. Cl. .................................. 356/364; 356/368

(58) Field of Classification Search .......... 356/364–368; 250/225, 559.09  
See application file for complete search history.

(56) References Cited

U.S. PATENT DOCUMENTS

| | | | |
|---|---|---|---|
| 5,557,324 A | 9/1996 | Wolff | |
| 5,726,755 A * | 3/1998 | Wolff | 356/364 |
| 7,295,312 B1 | 11/2007 | Gerhart et al. | |
| 7,349,087 B2 * | 3/2008 | Gerhart et al. | 356/364 |

* cited by examiner

*Primary Examiner* — Layla G. Lauchman  
(74) *Attorney, Agent, or Firm* — Osha • Liang LLP

(57) ABSTRACT

A device and a method for high-speed linear polarization imaging of a scene are disclosed. The device comprises a polarization modulator for modulating the polarization of light emitted from the scene in order to obtain at least three linear polarization states of the light. The polarization modulator comprises a polarizer, a first polarization rotation block comprising a fixed quarter-wave plate and a first liquid crystal operating as a quarter-wave plate, and a second polarization rotation block comprising a second liquid crystal operating as a half-wave plate. Each of the first and second liquid crystals are switchable between two states, thereby providing the at least three polarization states to the polarization modulator. The device further comprises a sensor adapted to capture image frames of the light from the scene at each polarization state of the polarization modulator.

14 Claims, 4 Drawing Sheets

METHOD AND SYSTEM FOR STOKES POLARIZATION IMAGING

BACKGROUND OF INVENTION

1. Field of the Invention

The present invention relates generally to a system and a method for determining linear Stokes parameters and particularly to high-speed linear polarization imaging of a scene.

2. Background Art

There are several ways to describe the polarization of light. The polarization can be totally described by 4 parameters. There are many sets of 4 parameters that can be used. The most natural parameters are the Stokes parameters, which represent the intensity of the light, the amount of linearly polarized light, the orientation of the linear polarization, and the amount of circularly polarized light (with the sign of this parameter depending on the rotation of the light). The Stokes parameters are regrouped in the Stokes vector, $$S = \begin{pmatrix} S_0 \\ S_1 \\ S_2 \\ S_3 \end{pmatrix},$$

wherein $S_0$ is the total intensity of the light, and $S_1 = I_0 - I_{90}$ is the intensity of light through a horizontal polarizer minus the intensity of light through a vertical polarizer. For light that is totally linearly horizontally polarized, $S_1 = S_0$, and for light that is totally vertically linearly polarized, $S_1 = -S_0$.

Further, $S_2 = I_{45} - I_{-45}$ is the intensity of light that passed through a polarizer oriented at 45° minus the intensity of light that passed through a polarizer oriented at −45°. For light that is totally linearly polarized at 45°, $S_2 = S_0$, and for light that is totally linearly polarized at −45°, $S_2 = -S_0$. Finally, $S_3 = I_{rh} - I_{lh}$ is the intensity of light that passed through a right-handed circular polarizer minus the intensity of light that passed through a left-handed circular polarizer. For light that is totally right-hand circularly polarized, $S_3 = S_0$, and for light that is totally left-hand circularly polarized, $S_3 = -S_0$.

The transformation of the Stokes vector of light propagating through an optical component can be described using the Mueller matrix of the component. Any optical component can be described by its Mueller matrix, $$S_{out} = \begin{pmatrix} S_0^{out} \\ S_1^{out} \\ S_2^{out} \\ S_3^{out} \end{pmatrix} = M_{comp} S_{in} = \begin{pmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{pmatrix} \begin{pmatrix} S_0^{in} \\ S_1^{in} \\ S_2^{in} \\ S_3^{in} \end{pmatrix}.$$

This linear algebra formalism is used to describe the change of polarization of light.

The linear Stokes parameters S0, S1, and S2 are the most used in polarization imaging as the circular polarization is not very common. Although it is possible to measure the linear Stokes parameters with only 3 polarization orientations (−60°, 0°, and 60° are generally used), these parameters are usually measured using 4 polarization orientations at −45°, 0°, 45°, and 90°.

Currently, several systems for the measurement of linear Stokes parameters exist. One system includes a CCD camera with rotating polarizers. As an example, a rapid 4-Stokes parameter determination system comprising a filter wheel is described, for example, in U.S. Pat. No. 7,295,312. These systems can have a very good resolution. However, the mechanical rotation of a polarizer does not allow high speed measurements. This limits their use mainly to still targets and laboratory measurements.

Other systems use micropolarizer arrays in front of the sensor. These systems do not have moving parts so that they can be very fast. However, the achievable image resolution is reduced because of pixel interpolation to compensate for the fact that each pixel only sees one polarization state. The real lateral resolution of the final image is one half of the lateral resolution of the sensor due to the interpolation, leading to an effective reduction by a factor 4 the number of pixels of the sensor.

Finally, further systems include separated cameras that each see one state of polarization of the light. For example, document U.S. Pat. No. 5,557,324 discloses a polarization viewer with two CCD chips. Systems with separated cameras do not have moving parts, allow high resolution, but are very sensitive to alignment and also expensive as they require at least 3 times the hardware of a single camera.

It is an aim of the invention to provide an improved system and an improved method for polarization imaging and the determination of Stokes parameters.

SUMMARY OF INVENTION

In a first aspect, the present disclosure relates to a device for polarization imaging comprising a polarization modulator for modulating the polarization of light emitted from the scene in order to obtain at least three linear polarization states of the light, the polarization modulator comprising a polarizer, a first polarization rotation block comprising a fixed quarter-wave plate and a first liquid crystal operating as a quarter-wave plate, and a second polarization rotation block comprising a second liquid crystal operating as a half-wave plate, wherein each of the first and second liquid crystals are switchable between two states, thereby providing the at least three polarization states to the polarization modulator, and a sensor adapted to capture image frames of the light from the scene at each polarization state of the polarization modulator.

In a second aspect, the present disclosure relates to a method for high-speed linear polarization imaging of a scene, the method comprising producing a trigger signal using a sensor, modulating the polarization of light emitted from the scene using a polarization modulator comprising a polarizer, a first polarization rotation block comprising a fixed quarter-wave plate and a first liquid crystal operating as a quarter-wave plate, and a second polarization rotation block comprising a second liquid crystal operating as a half-wave plate, wherein each of the first and second liquid crystals is switched between two states in response to the trigger signal in order to successively obtain at least three linear polarization states of the polarization modulator, transmitting the light from the scene through the polarization modulator onto the sensor, capturing image frames using the sensor at each polarization state of the polarization modulator, and processing the captured image frames in order to obtain linear Stokes parameters for the scene.

Other aspects, characteristics, and advantages of the invention will be apparent from the following detailed description.

DETAILED DESCRIPTION

Figure 1A:
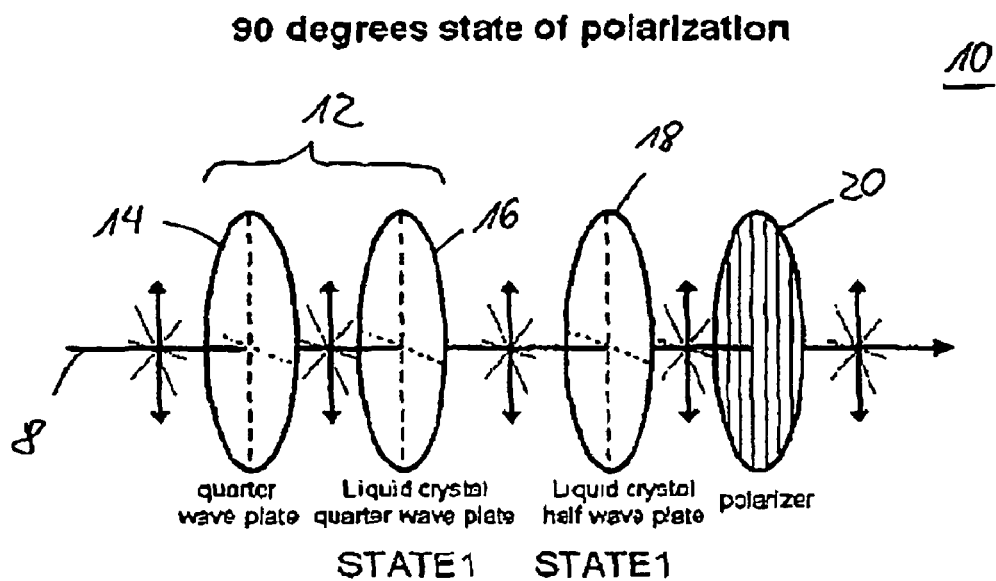
FIGS. 1a-1d schematically show a polarization modulator of a polarization imaging device according to embodiments disclosed herein.
Figure 1B:
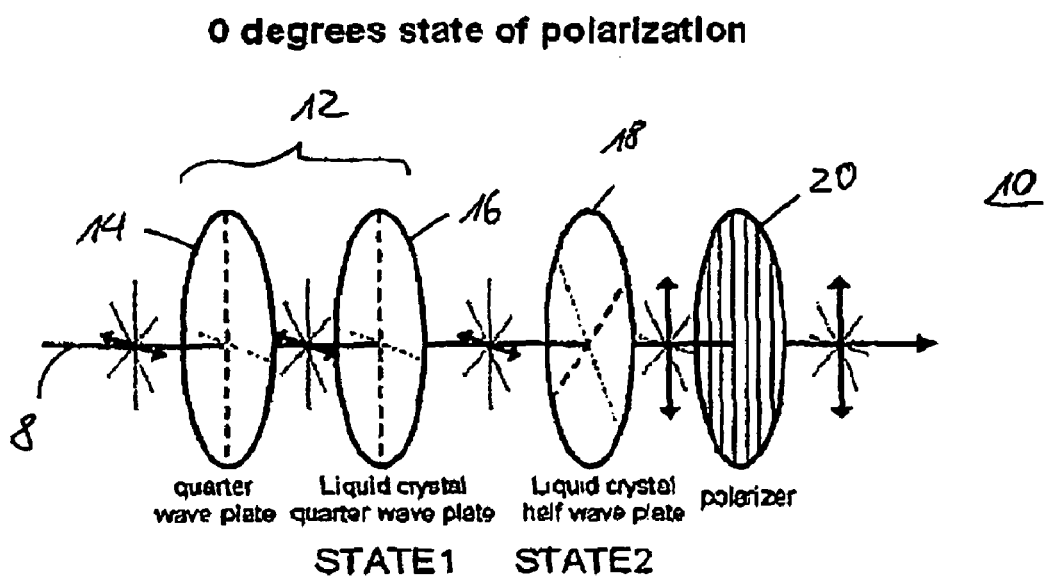
Figure 1C:
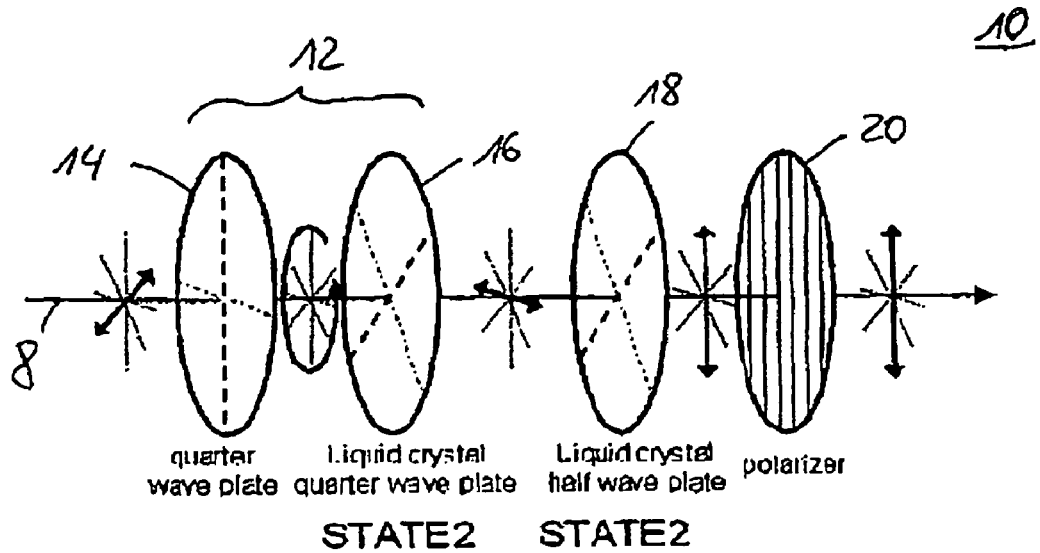
Figure 1D:
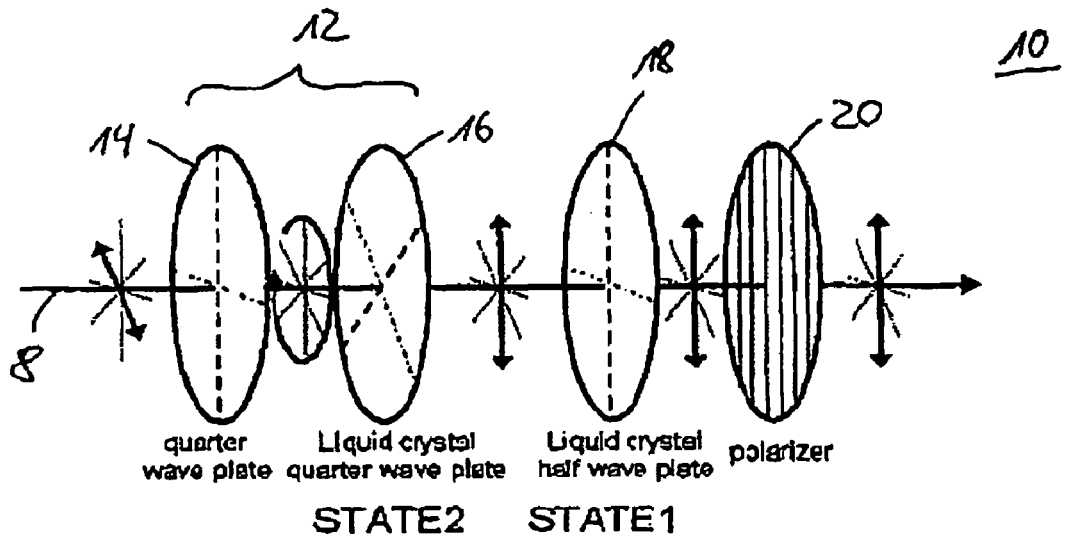

Specific embodiments of the present disclosure will now be described in detail with reference to the accompanying Figures. Like elements in the various Figures are denoted by like reference numerals for consistency.

In general, embodiments of the present disclosure relate to a device and a method for reliable, high-speed linear polarization imaging of a scene. More specifically, embodiments of the present disclosure provide a method and a device for linear polarization imaging, whereby the imaging device includes a polarization modulator allowing for high image resolution and fast switching times.

Referring to FIG. 1a, the polarization modulator 10 of the polarization imaging device according to embodiments of the present disclosure is shown. The polarization modulator 10 includes a first and a second polarization rotation block 12, 18, which are aligned with respect to each other, and a fixed polarizer 20. The first polarization rotation block 12 includes a fixed quarter-wave plate 14 and a first liquid crystal 16. The second polarization rotation block 18 includes a second liquid crystal 18. Each liquid crystal 16, 18 and the quarter-wave plate 14 have a fast and a slow optical axis. The first liquid crystal 16 functions as a quarter-wave plate, and the second liquid crystal 18 functions as a half-wave plate.

The liquid crystals 16, 18 may preferably be in two states, a state 1 and a state 2. In state 1, the polarization plane of linearly vertically or horizontally polarized light is not affected. In state 2, the fast axis of the liquid crystals 16, 18 is rotated by 45°. The polarization plane of the light passing through the fixed quarter-wave plate 14 and the first liquid crystal 16 is rotated by 45°. The polarization plane of the light passing through the second liquid crystal 18 is rotated by 90°.

In the embodiment as shown in FIGS. 1a-1d, light 8 from the scene to be imaged first passes through the first polarization rotation block 12, then through the second polarization rotation block 18, and finally through the fixed polarizer 20. However, as the person skilled in the art will appreciate, the respective position of the first and the second polarization rotation blocks 12, 18 may be switched.

Preferably, the liquid crystals 16, 18 are bistatic liquid crystals, and, in particular, ferroelectric liquid crystals. However, any other bistatic crystal known in the art and having the rotation characteristics described above may be implemented with the polarization modulator.

The 4 possible combinations of the first and the second polarization rotation blocks 12, 18 in state 1 and state 2 provide the 4 needed linear polarization states, i.e., 45°, 0°, −45°, and 90°, respectively. The polarization modulator 10 with the 4 possible combinations of the first and second block 12, 18 is shown in FIGS. 1a-1d.

The polarization modulator will now be described using the Mueller matrix formalism. The Mueller matrix of the fixed quarter-wave plate with its fast axis being horizontal is:

$$M_{1/4WP} = \begin{pmatrix} 1 & 0 & 0 & 0 \\ 0 & 1 & 0 & 0 \\ 0 & 0 & 0 & 1 \\ 0 & 0 & -1 & 0 \end{pmatrix}.$$

The Mueller matrix of the first liquid crystal, acting as a quarter-wave plate, is for the two possible states:

state 1(fast axis vertical):

$$M_{1/4WP} = \begin{pmatrix} 1 & 0 & 0 & 0 \\ 0 & 1 & 0 & 0 \\ 0 & 0 & 0 & -1 \\ 0 & 0 & 1 & 0 \end{pmatrix},$$

state 2(fast axis at 45°):

$$M_{1/4WP} = \begin{pmatrix} 1 & 0 & 0 & 0 \\ 0 & 0 & 0 & -1 \\ 0 & 0 & 1 & 0 \\ 0 & 1 & 0 & 0 \end{pmatrix}.$$

Multiplying the matrix of the fixed quarter-wave plate with the matrix of the first liquid crystal, we obtain the Mueller matrix of the first block for the two possible states of the first liquid crystal:

state 1: (1)

$$M_{45rotator1} = \begin{pmatrix} 1 & 0 & 0 & 0 \\ 0 & 1 & 0 & 0 \\ 0 & 0 & 1 & 0 \\ 0 & 0 & 0 & 1 \end{pmatrix},$$

state 2: (2)

$$M_{45rotator2} = \begin{pmatrix} 1 & 0 & 0 & 0 \\ 0 & 1 & 0 & 0 \\ 0 & 0 & 0 & 1 \\ 0 & 1 & 0 & 0 \end{pmatrix}.$$

The $m_{22}$ and $m_{23}$ coefficients that change between state 1 and state 2 indicate the 45° polarization rotation between the two states of the first liquid crystal 16 for a horizontal or a vertical linear polarization of the light.

The Mueller matrix of the second liquid crystal for the two possible states is:

state 1(fast axis horizontal): (3)

$$M_{1/2WP} = \begin{pmatrix} 1 & 0 & 0 & 0 \\ 0 & 1 & 0 & 0 \\ 0 & 0 & -1 & 0 \\ 0 & 0 & 0 & -1 \end{pmatrix},$$

state 2(fast axis at 45°): (4)

$$M_{1/2WP} = \begin{pmatrix} 1 & 0 & 0 & 0 \\ 0 & -1 & 0 & 0 \\ 0 & 0 & 1 & 0 \\ 0 & 0 & 0 & -1 \end{pmatrix}.$$

Finally, the Mueller matrix of the fixed (vertical) polarizer is:

$$M_{polarizer} = \frac{1}{2}\begin{pmatrix} 1 & -1 & 0 & 0 \\ -1 & 1 & 0 & 0 \\ 0 & 0 & 0 & 0 \\ 0 & 0 & 0 & 0 \end{pmatrix}. \quad (5)$$

Multiplying successively the matrices (1)-(5), we obtain the Mueller matrix of the polarization modulator, which is for the 4 possible states:

state 1-1:

$$M_{1-1} = \frac{1}{2}\begin{pmatrix} 1 & -1 & 0 & 0 \\ -1 & 1 & 0 & 0 \\ 0 & 0 & 0 & 0 \\ 0 & 0 & 0 & 0 \end{pmatrix},$$

state 1-2:

$$M_{1-2} = \frac{1}{2}\begin{pmatrix} 1 & 1 & 0 & 0 \\ -1 & -1 & 0 & 0 \\ 0 & 0 & 0 & 0 \\ 0 & 0 & 0 & 0 \end{pmatrix},$$

state 2-1:

$$M_{2-1} = \frac{1}{2}\begin{pmatrix} 1 & 0 & -1 & 0 \\ -1 & 0 & 1 & 0 \\ 0 & 0 & 0 & 1 \\ 0 & 0 & -1 & 0 \end{pmatrix}, \text{ and}$$

state 2-2:

$$M_{2-2} = \frac{1}{2}\begin{pmatrix} 1 & 0 & 1 & 0 \\ -1 & 0 & -1 & 0 \\ 0 & 0 & 0 & 0 \\ 0 & 0 & 0 & 0 \end{pmatrix}.$$

"State i-j" signifies that the first liquid crystal is in state I and the second liquid crystal is in state j.

For an incoming Stokes vector $$S = \begin{pmatrix} S_0 \\ S_1 \\ S_2 \\ S_3 \end{pmatrix},$$

the intensity I measured on the camera is for the 4 possible states of the polarization modulator:

State 1-1: $I=\frac{1}{2}(S_0-S_1)$. This is the intensity that would be measured with a vertical polarizer.

State 1-2: $I=\frac{1}{2}(S_0+S_1)$. This is the intensity that would be measured with a horizontal polarizer.

State 2-1: $I=\frac{1}{2}(S_0-S_2)$. This is the intensity that would be measured with a polarizer at −45°.

State 2-2: $I=\frac{1}{2}(S_0+S_2)$. This is the intensity that would be measured with a polarizer at +45°.

Therefore, the 4 states of polarization of the polarization modulator give access to 4 measurements of intensity that are the same as those that would be measured with a polarizer in the following positions: −45°, 0°, 45°, and 90°.

Figure 2:
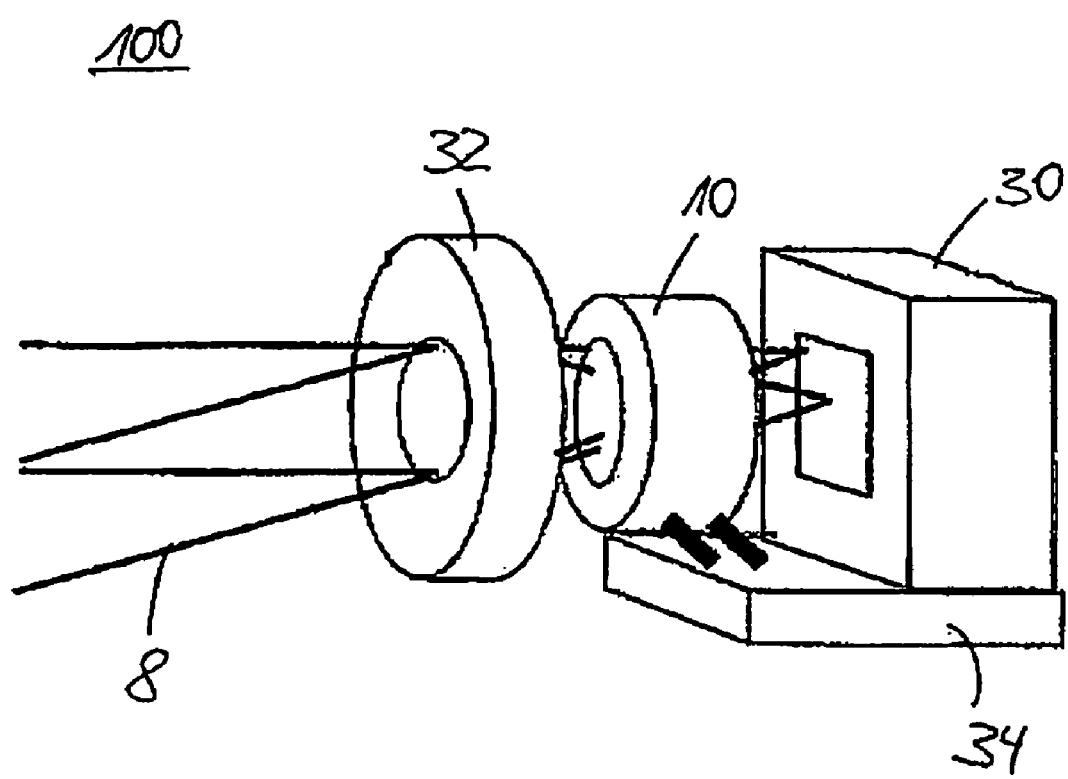
FIG. 2 schematically shows a polarization imaging device according to embodiments disclosed herein.

Referring now to FIG. 2, the device 100 for polarization imaging according to embodiments of the present disclosure is schematically shown. The device 100 includes the polarization modulator 10 as described above and shown in FIGS. 1a-1d. The device 100 further includes a sensor 30 and a synchronization unit 34. The sensor 30 is responsive to the light 8 from the scene that has passed through the polarization modulator 10. Preferably, the sensor 30 is a CCD camera. The synchronization unit 34 synchronizes the polarization modulator 10 with the sensor 30. The synchronization unit 34 may be integrated with the device 100 as shown in FIG. 2, or may be situated externally.

A lens 32 may be positioned in front of the polarization modulator 10 so that the light from the scene passes through the lens 32, the polarization modulator 10 and onto the sensor 30 to form an image of the scene 36. The polarization modulator 10 may be positioned wherever in the optical path between pupil position and image position. Further, as the skilled person will appreciate, the lens may also be positioned behind the polarization modulator so that the light form the scene first passes through the polarization modulator and is then focused by the lens onto the sensor.

Figure 3:
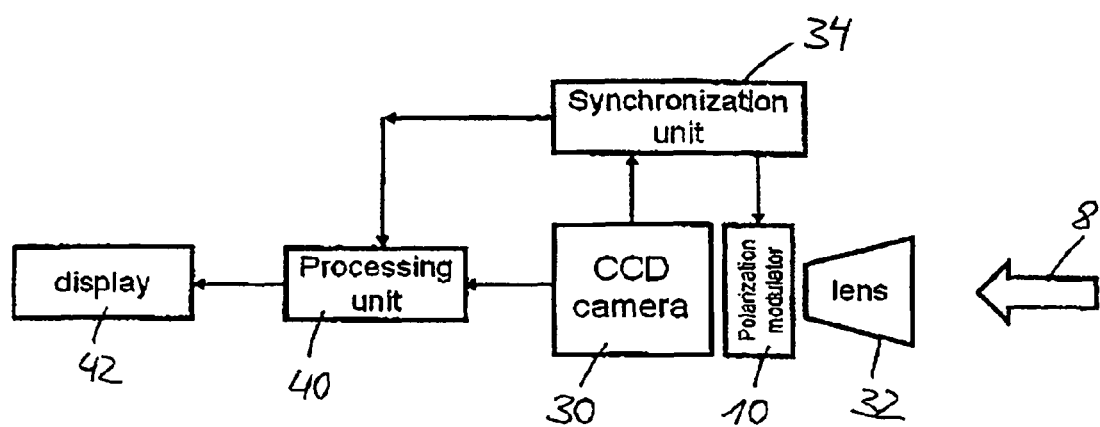
FIG. 3 schematically shows a polarization imaging system according to embodiments disclosed herein.

In FIG. 3, a polarization imaging system according to embodiments disclosed herein including the polarization imaging device and its operation principle are shown. The arrows designate the information flux between elements of the system. The light 8 from a scene passes through the lens 32 and the polarization modulator 10 and falls onto the sensor 30 or CCD camera. The synchronization unit 34 receives a trigger signal from the CCD camera 30 when a frame has been shot. The trigger signal prompts the polarization modulator 10 to change from one of its 4 possible states to another one after each shot frame. The delay between the change of the polarization state of the polarization modulator 10 and the next frame to be acquired allows the polarization modulator 10 to stabilize in its actual state. One frame is shot in each of the 4 states of the polarization modulator 10.

Still referring to FIG. 3, the polarization imaging system further includes a processing unit 40 and output means 42. The synchronization unit 34 sends a signal to the processing unit 40 that indicates the state of the polarization modulator 10 at each frame acquisition of the CCD camera 30. The processing unit 40 receives the image frames from the CCD camera 30 and a signal about the polarization state of the polarization modulator 10. Using this, the processing unit 40 then computes polarization images for each series of 4 successive image frames, which correspond to the 4 possible states of the polarization modulator 10. The output means 42 may be, for example, a monitor or a display, or may take any other form, as the skilled person will appreciate.

As the person skilled in the art will appreciate, other operation principles of the device according to the present disclosure may be applied. For example, the processing unit may send a control signal to the synchronization unit, and the synchronization unit may then send trigger signals to both the polarization modulator (to change its polarization state) and the sensor (to capture one image frame).

In the method according to embodiments disclosed herein, a trigger signal is produced by the sensor with a frequency that corresponds to the frame rate of the sensor. Light from a scene to be imaged by the device as described above is transmitted through the polarization modulator onto the sensor. The light is linearly polarized when passing though the polarization modulator. The trigger signal is received by the synchronization unit and it prompts the polarization modulator to change from one polarization state to another successively.

One image frame is captured by the sensor at each polarization state of the polarization modulator. For example, one image frame is captured at 0°, 45°, 90°, and −45°, respectively. Once this series of 4 frames is captured, the polarization modulator is driven to its initial polarization state (0°), and a new series of image frames is captured. Each series of 4 frames is processed by the processing unit so as to obtain linear Stokes parameters that characterize the scene. The Stokes parameters are calculated for each captured frame series, i.e., three Stokes parameters are determined using four measurements. As four images are taken and only three Stokes parameters are deduced, the problem is redundant. This redundancy helps to reduce noise propagation within the measurement.

A full calibration process may be performed for the polarization imaging device in order to compensate for slight imperfections of element orientations, chromatic and spectral dependence of optical elements, finite contrast of the fixed polarizer, etc.

As only the linear polarization states of the light are of interest for the device, the calibration process includes using a rotating linear polarizer. The Stokes vector for a linear polarizer used as a reference is of the following form:

$$S_{in} = \begin{pmatrix} S_0^{in} \\ S_1^{in} \\ S_2^{in} \\ 0 \end{pmatrix}.$$

For a given state of the liquid crystals, the output Stokes vector is:

$$S_{out} = \begin{pmatrix} S_0^{out} \\ S_1^{out} \\ S_2^{out} \\ S_3^{out} \end{pmatrix}$$

$$= M_{pol\_mod} S_{in}$$

$$= \begin{pmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{pmatrix} \begin{pmatrix} S_0^{in} \\ S_1^{in} \\ S_2^{in} \\ 0 \end{pmatrix}.$$

As only the intensity $S_0^{out}$ can be measured on the sensor, it is only possible to know $m_{11}$, $m_{12}$, and $m_{13}$. Thus, $$I_{out} = \begin{pmatrix} m_{11} & m_{12} & m_{13} \end{pmatrix} \begin{pmatrix} S_0^{in} \\ S_1^{in} \\ S_2^{in} \end{pmatrix}.$$

For a given polarization state of the imaging device and for n linear polarizer orientations, we may write $$I_{measured} = \begin{pmatrix} I_{out}^1 \\ \ldots \\ I_{out}^n \end{pmatrix} = \begin{pmatrix} {}^1S_0^{in} & {}^1S_1^{in} & {}^1S_2^{in} \\ \ldots & \ldots & \ldots \\ {}^nS_0^{in} & {}^nS_1^{in} & {}^nS_2^{in} \end{pmatrix} \begin{pmatrix} m_{11} \\ m_{12} \\ m_{13} \end{pmatrix},$$

which is an equation of the following type: $Y_{measured} = A_{knownStokes} * X_{pol\_mod}$. This is an inverse problem that is linear and thus can be solved using $A^+$, the Moore-Penrose pseudo inverse of matrix A, $$X_{pol\_mod} = \begin{pmatrix} m_{11} \\ m_{12} \\ m_{13} \end{pmatrix} = A^+ I_{measured}.$$

The pseudo inverse matrix has to be used as A is not square and thus not invertible. If the parameters $m_{11}$, $m_{12}$, and $m_{13}$ are known, the state of polarization observed by the polarization imaging device is perfectly determined.

As stated above, the purpose of the polarization imaging device according to embodiments disclosed herein is to determine the linear Stokes parameters of incoming light from a scene, whereby the incoming light is represented by an incoming unknown Stokes vector. For an unknown Stokes vector, without taking into account the circular polarization parameter $S_3$, 4 different intensities are measured at the 4 states of the polarization imaging device, $$\begin{pmatrix} I_{state1} \\ I_{state2} \\ I_{state3} \\ I_{state4} \end{pmatrix} = \begin{pmatrix} m_{11}^{state1} & m_{12}^{state1} & m_{13}^{state1} \\ m_{11}^{state2} & m_{12}^{state2} & m_{13}^{state2} \\ m_{11}^{state3} & m_{12}^{state3} & m_{13}^{state3} \\ m_{11}^{state4} & m_{12}^{state4} & m_{13}^{state4} \end{pmatrix} \begin{pmatrix} S_0^{in} \\ S_1^{in} \\ S_2^{in} \end{pmatrix}.$$

This equation is of the form: $Y_{measured} = B_{known\_pol\_mod} * X_{stokes}$. This is again an inverse problem that can be solved using $B^+$, the Moore-Penrose pseudo inverse of matrix B, $$Y_{measured} = \begin{pmatrix} S_0^{in} \\ S_1^{in} \\ S_2^{in} \end{pmatrix} = B^+ \begin{pmatrix} I_{state1} \\ I_{state2} \\ I_{state3} \\ I_{state4} \end{pmatrix}.$$

The $B^+$ matrix, which linearly links the intensities measured on the 4 images acquired with the imaging device to the Stokes parameters of the incoming light, is the calibration matrix of the device. It represents the linear relations that have to be applied to the 4 images taken at the 4 states of the device to obtain the 3 linear Stokes parameters $S_0$, $S_1$, and $S_2$. From these 3 parameters, all the linear polarization data (degree of linear polarization, orientation of the polarization plane, etc.) can be deduced.

The $B^+$ matrix may be calculated for the whole image. It may also be calculated for each pixel if there is a field dependence of the polarization parameters, as this would be the case, for example, when using a wide angle objective lens. If a color CCD camera is used, the chromatic dependence of the polarization parameters may be compensated with a different $B^+$ matrix for each color channel. The $B^+$ matrix is stored within the processing unit of the polarization imaging system.

As an example, if the liquid crystals and the polarizer are perfect, it is possible to write $$\begin{pmatrix} I_{state1} \\ I_{state2} \\ I_{state3} \\ I_{state4} \end{pmatrix} = \begin{pmatrix} I_{90} \\ I_0 \\ I_{-45} \\ I_{45} \end{pmatrix}.$$

As the Stokes parameters $S_0 = \frac{1}{2}(I_0+I_{90}) = \frac{1}{2}(I_{45}+I_{-45}) = \frac{1}{4}(I_0+I_{45}+I_{-45}+I_{90})$, $S_1 = I_0-I_{90}$, and $S_2 = I_{45}-I_{-45}$, the matrix $B^+$ is defined as:

$$B^+ = \begin{pmatrix} 0.25 & 0.25 & 0.25 & 0.25 \\ -1 & 1 & 0 & 0 \\ 0 & 0 & -1 & 1 \end{pmatrix}.$$

Advantageously, devices and methods of the present disclosure may provide at least one of the following advantages. Since no mechanical rotation of polarizers is necessary for polarization rotation, very low switching times of the device (around 40 microseconds) can be obtained so that high-speed measurements are possible. The time required to obtain the 3 linear Stokes parameters is thus determined by the switching time of the polarization modulator and the frame rate of the sensor. In particular, ferroelectric liquid crystals may be switched faster switch than nematic liquid crystals. Furthermore, the use of liquid crystals allows for high resolution as no pixel interpolation as with micropolarizer arrays is necessary. The device takes advantage of the fill sensor resolution. As only one sensor is required, the system is more cost effective and compact than multi-sensor system. Additionally, the use of bistatic liquid crystals renders the system of the present disclosure robust against external and operational conditions (voltage, temperature variations, etc.).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A device for a high-speed linear polarization imaging of a scene, the device comprising:
   a polarization modulator for modulating the polarization of light emitted from the scene in order to obtain at least three linear polarization states of the light, the polarization modulator comprising:
      a polarizer,
      a first polarization rotation block comprising a fixed quarter-wave plate and a first liquid crystal operating as a quarter-wave plate, and
      a second polarization rotation block comprising a second liquid crystal operating as a half-wave plate,
   wherein each of the first and second liquid crystals are switchable between two states, thereby providing the at least three polarization states to the polarization modulator; and
   a sensor adapted to capture image frames of the light from the scene at each polarization state of the polarization modulator.

2. The device of claim 1, further comprising a synchronization unit adapted to receive a trigger signal from the sensor to successively change the polarization state of the polarization modulator according to the trigger signal.

3. The device of claim 1, wherein the first and the second liquid crystals are ferroelectric liquid crystals.

4. The device of claim 1, wherein the first polarization rotation block provides a 45° polarization rotation and the second polarization rotation block provides a 90° polarization rotation.

5. The device of claim 1, wherein the at least three polarization states comprise a 0°, a 45°, a 90°, and a −45° linear polarization state.

6. The device of claim 1, further comprising processing means adapted to process the captured image frames in order to obtain linear Stokes parameters for the scene.

7. The device of claim 1, further comprising a display adapted to display the captured image frames.

8. The device of claim 6, wherein the processing means are further comprise a calibration unit adapted to calibrate the device, the calibration unit comprising storing means adapted to store a calibration matrix.

9. The device of claim 1, further comprising a lens adapted to form an image in the sensor plane.

10. A method for high-speed linear polarization imaging of a scene, the method comprising:
    producing a trigger signal using a sensor;
    modulating the polarization of light emitted from the scene using a polarization modulator comprising a polarizer, a first polarization rotation block comprising a fixed quarter-wave plate and a first liquid crystal operating as a quarter-wave plate, and a second polarization rotation block comprising a second liquid crystal operating as a half-wave plate, wherein each of the first and second liquid crystals is switched between two states in response to the trigger signal in order to successively obtain at least three linear polarization states of the polarization modulator;
    transmitting the light from the scene through the polarization modulator onto the sensor;
    capturing image frames using the sensor at each polarization state of the polarization modulator; and
    processing the captured image frames in order to obtain linear Stokes parameters for the scene.

11. The method of claim 10, wherein the first polarization rotation block provides a 45° polarization rotation and the second polarization rotation block provides a 90° polarization rotation.

12. The method of claim 10, wherein the at least three polarization states comprise a 0°, a 45°, a 90°, and a −45° linear polarization state.

13. The method of claim 10, further comprising calibrating the system, wherein the calibrating comprises:
    measuring the intensities of linearly polarized light for a given polarization state of the polarization modulator and n polarizer orientations, wherein the light is represented by a known incoming Stokes vector;

calculating elements of the Mueller matrix of the polarization modulator using the measured intensities and the known incoming Stokes vector;

measuring the intensities of light from a scene at at least three polarization states of the polarization modulator, wherein the light from the scene is represented by an unknown incoming Stokes vector; and determining a calibration matrix that links the measured intensities of light from the scene to the unknown incoming Stokes vector using the elements of the Mueller matrix of the polarization modulator.

14. The method of claim 13, wherein the processing comprises applying the calibration matrix to the captured images to obtain the linear Stokes parameters for the scene.

* * * * *